(12) United States Patent
Wang et al.

(10) Patent No.: US 8,753,035 B2
(45) Date of Patent: Jun. 17, 2014

(54) ASPHALT CONCRETE PAVEMENT CONTAINING WAVE ABSORBING MATERIAL AND MAINTENANCE PROCESS THEREOF

(75) Inventors: Houliang Wang, Suzhou (CN); Wanzhong Guan, Suzhou (CN); Bin Yuan, Suzhou (CN)

(73) Assignee: Bin Yuan, Suzhou (CN)

( * ) Notice: Subject to any disclaimer, the term of this patent is extended or adjusted under 35 U.S.C. 154(b) by 0 days.

(21) Appl. No.: 13/263,739

(22) PCT Filed: Apr. 9, 2010

(86) PCT No.: PCT/CN2010/000472
§ 371 (c)(1),
(2), (4) Date: Oct. 8, 2011

(87) PCT Pub. No.: WO2010/115349
PCT Pub. Date: Oct. 14, 2010

(65) Prior Publication Data
US 2012/0027513 A1    Feb. 2, 2012

(30) Foreign Application Priority Data

Apr. 10, 2009 (CN) .......................... 2009 1 0116510
Sep. 30, 2009 (CN) .......................... 2009 1 0185168

(51) Int. Cl.
*E01C 3/00* (2006.01)
(52) U.S. Cl.
USPC ............................................. 404/31; 404/77

(58) Field of Classification Search
USPC .............................. 404/77, 79, 80, 81, 31, 71
See application file for complete search history.

(56) References Cited

U.S. PATENT DOCUMENTS

| 3,206,319 | A | * | 9/1965 | Minnick et al. ............... 106/668 |
| 3,585,155 | A | * | 6/1971 | Hollstein ................... 106/284.3 |
| 3,907,582 | A | * | 9/1975 | Walter ..................... 106/284.01 |
| 4,319,856 | A | * | 3/1982 | Jeppson .......................... 404/79 |
| 4,453,856 | A | * | 6/1984 | Chiostri et al. ................. 404/91 |
| 4,594,022 | A | * | 6/1986 | Jeppson .......................... 404/28 |
| 4,849,020 | A |   | 7/1989 | Osborne et al. |
| 5,092,706 | A | * | 3/1992 | Bowen et al. ................... 404/77 |
| 5,441,360 | A | * | 8/1995 | Long et al. ...................... 404/77 |
| 5,480,256 | A | * | 1/1996 | Itsekson et al. ................. 404/72 |
| 5,788,407 | A | * | 8/1998 | Hwang .......................... 404/81 |
| 6,193,793 | B1 | * | 2/2001 | Long et al. ............... 106/284.05 |
| 7,160,049 | B2 | * | 1/2007 | Saito et al. ..................... 404/17 |
| 7,413,375 | B2 | * | 8/2008 | Hall .............................. 404/77 |
| 2003/0231928 | A1 | * | 12/2003 | Hildebrand et al. ............ 404/17 |

* cited by examiner

*Primary Examiner* — Matthew D Troutman
(74) *Attorney, Agent, or Firm* — IPro, Inc.; Na Xu

(57) ABSTRACT

An asphalt concrete pavement containing a wave absorbing material and a maintenance process thereof are provided. The asphalt concrete pavement includes: 1. a coarse materials consisted of small stone with a grain size of 10-15 mm, macadam with a grain size of 5-10 mm and stone chip with a grain size of 0.1-5 mm; 2. fine materials consisted of sand; 3. a mineral powder containing a wave absorbing material which accounts for 10%-100% of the mineral powder by weight percentage. Furthermore, an asphalt concrete material for making asphalt concrete pavement, a mineral powder containing a wave absorbing material, and a use of the mineral powder or wave absorbing material in making the asphalt concrete pavement are provided.

7 Claims, 1 Drawing Sheet

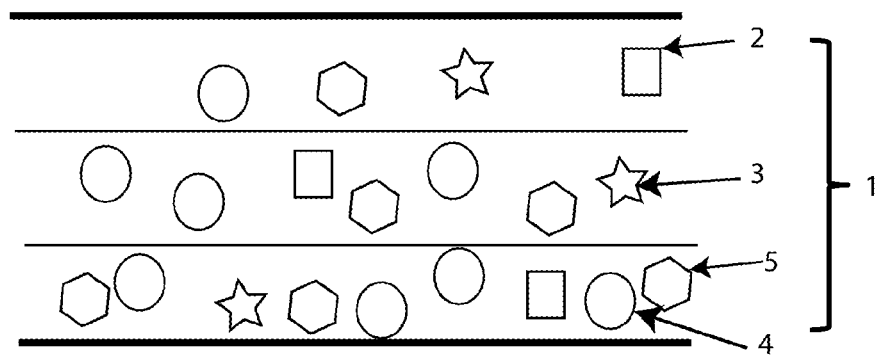

ASPHALT CONCRETE PAVEMENT CONTAINING WAVE ABSORBING MATERIAL AND MAINTENANCE PROCESS THEREOF

The present invention generally relates to an asphalt concrete pavement containing a wave absorbing material and a maintenance process thereof. The present invention also relates to a use of said wave absorbing material in making the asphalt concrete pavement. The asphalt concrete pavement of the present invention can be heated by microwaves and can be maintained in the microwave heating mode.

BACKGROUND

According to the related statistics, the construction cost of asphalt concrete pavements accounts for ¼-⅓ of the total construction cost of highways. Most maintenance cost is used for the pavements, and the asphalt concrete pavements generally have two main technical and quality defects. One defect is poor durability. The longer service life of the current domestic asphalt concrete pavements is from 8 to 12 years, and is generally shorter than 15 to 20 years of the designed service life; some pavements even need to be integrally reconstructed in 3 to 5 years. The other defect is that the pavements are seriously destroyed in early phase of use. Some new highways need to be maintained because pot holes, cracks, furrows and insufficient skid resistance, etc., occur only after the new highways are used for 1-3 years, or 6 to 8 years as the longer service life.

The preventive maintenance process is a systematic process of taking a series of maintenance measures in the life cycle of the asphalt concrete pavements. The preventive maintenance can improve the highway conditions, increase the driving quality, extend the pavement service life, reduce the life cycle cost, and can use an economic and effective mode to extend the pavement service life and improve the highway system performance.

Research indicates that the benefit-cost ratio of the preventively maintained pavements is from 6 to 10 times of that of the pavements without taking any maintenance measures. Related data shows that the performance of a qualified highway is reduced by 40% within 75% of the service life, and this stage is called preventive maintenance stage. If the highway is not maintained in time in this stage, its performance will be reduced by 40% once again within the following 12% of the service life, while the maintenance cost will be added by 3 to 10 times. After the asphalt pavement is preventively maintained, the cost can be saved for about 70%.

The asphalt mixture is a typical visco-elasto-plastic material, and mainly represents as a viscoelastic body within the range of actual operation, and represents as a visco-elasto-plastic body during construction compaction. The inelasticity of the material is mainly represented by non-recovery of deformation after unloading, namely the plasticity and the instantaneous non-recovery are the viscosity or elasticity aftereffect. Any visco-elasto-plastic material has rheological behavior, its rheological behavior and destructive behavior are related to time or temperature; the intensity and modulus will be rapidly reduced with temperature rise, and the furrow deformation resistance will be reduced. Thus, under the conditions of channelized traffic and heavy-loaded traffic of the existing highway, the furrows and other defects appearing on the pavements after a period of time are unavoidable.

The highway network of China has basically been built and will be completely maintained soon. As the new construction of the highway, maintenance requires a whole set of advanced technology. With the quick and harmonious development of the national economy, the number of highway vehicles in China is increased with time, and the highway pavements face serious challenges from the large-size vehicles and serious overloading vehicles. The effective service life of the existing highways generally cannot achieve its designed service life, and early serious damage often appears on the highway when it is only used for 1 to 3 years. Under the condition of serious shortage of cost for highway construction and maintenance, studying the preventive maintenance process for the asphalt pavement has especially crucial practical significance.

There are mainly two defects appearing on the asphalt concrete pavements of the current highways: 1, furrows and particularly serious furrows existing in the heavy-loaded vehicle lanes, because of large-size vehicles and serious overloading vehicles; 2, asphalt peeling because of ageing of asphalt, and insufficient adhesive force between asphalt and granular materials, insufficient degree of compaction of the asphalt pavement, micro cracks caused by large void fraction, chaps, check cracks, looseness, pitting surfaces, water seepage, etc.

For controlling the two early serious defects, the common method, which is milling first and then repaving, greatly wastes the resources of non-renewable stone and imported asphalt, and seriously pollutes the environment. The micro-surface treatment technique is used for partial highway sections. The micro-surface treatment technique is a cold mixing construction technique, which uses the macromolecular improved emulsified asphalt as a binding material and uses the thin layer technique as a main technique. In the technique, the polymer improved emulsified asphalt, the coarse and fine materials, the filling materials, water, additives and other materials are mixed into a slurry mixture in accordance with the designed proportion; the mixture is paved on the original pavement to form a thin layer with high skid resistance and durability, and the highway can be used soon. The micro-surface treatment technique has good water-preventing effect, can effectively prevent the water damage of pavement from occurring and developing, and can reverse the passive situation of continued need to repair pavement pot holes. The technique is mainly used for establishing and recovering the highway surface function, so that the highway is formed with a surface function layer with the advantages of water prevention, skid resistance, abrasion resistance and durability. However, the technique also has obvious defects, such as appearance bumps like the blemish scars, loud driving noise, and botchy appearance if peeling occurs.

The asphalt rejuvenator agent is a product for improving the performance of the aged asphalt through the chemical reaction between asphalt rejuvenator agent and asphalt. The stock solution of the asphalt rejuvenator agent is a low-concentration liquid with high fluidity. In the field test, the hairy tiny cracks are preferably treated by the asphalt rejuvenator agent, the asphalt rejuvenator agent can penetrate into the inside of the hairy cracks, and the stock solution of the asphalt rejuvenator agent can continually penetrate into the cracks if the cracks are deeper. The asphalt rejuvenator agent has the following characteristics: 1. water resistance: water penetration test indicates that the water penetration quantity of the pavement treated by the asphalt rejuvenator agent can be reduced by 90%; 2. high fluidity: the asphalt rejuvenator agent can be used for treating the cracks with the width of less than 5 mm; before the crack width is less than 5 mm, it is impossible to maintain the pavement by milling and repaving, and it is difficult to fill hot asphalt in the tiny cracks; the concentrated solution or diluents of the asphalt rejuvenator agent is used for treating the cracks to achieve the effects of convenience, economy and obvious effects; 3. adhesiveness: the asphalt rejuvenator agent is the material of the same kind as asphalt, is preferably combined with asphalt by chemical reaction, and enables the aged asphalt to obtain regeneration; 4. penetrability: the penetrability of the asphalt rejuvenator agent depends on the size of the void fraction of the asphalt concrete and the degree of dilution of the asphalt rejuvenator agent.

At present, the main applications of asphalt rejuvenator agent include: 1. directly spraying on the asphalt concrete surface to form a spraying layer. This mode is simple, but will obtain poor repair effects, such as poor integrity, inability to repair the lower frame damage, poor surface flatness and the like, if heat treatment is not performed; 2. Adding the asphalt rejuvenator agent after crushing the original asphalt concrete, and mixing by heating method or cooling method to obtain regeneration. The mode destroys the pavement.

The asphalt concrete pavement maintenance is a significant and difficult issue before people. People try to provide effective modes for maintaining the asphalt concrete pavement, such as using asphalt rejuvenator agent, etc. However, the ingredient components of the existing asphalt concrete pavements determine that the existing asphalt concrete pavements are difficult to be effectively maintained under the instruction of the existing method.

Therefore, those skilled in the art are eager to find an effective maintenance process which is suitable for asphalt concrete pavements to meet more and more maintenance requirements of the asphalt concrete pavements.

SUMMARY

The aims of the present invention are to overcome the defects of the existing asphalt concrete pavements and solve the problems that the existing asphalt concrete pavements are difficult to maintain, to provide an asphalt concrete pavement containing a wave absorbing material, a maintenance process thereof, and a use of said wave absorbing material in making the asphalt concrete pavement. The inventor finds in surprise that the asphalt concrete pavement with the characteristics of the present invention can be heated by microwaves and can be effectively maintained in the microwave heating mode. The present invention is achieved on the basis of the aforementioned find.

BRIEF DESCRIPTION OF FIGURES

FIG. 1 is a schematic diagram of the asphalt concrete pavement of an embodiment of the present disclosure.

DESCRIPTION

The first aspect of the present invention provides an asphalt concrete pavement 1, which includes:
1) a coarse material 2 consisted of small stone with a grain size of 10-15 mm, macadam with a grain size of 5-10 mm and stone chip with a grain size of 0.1-5 mm;
2) a fine material 3 consisted of sand; and
3) a mineral powder 4;
wherein said mineral powder contains a wave absorbing material 5 which accounts for 10%-100% of the mineral powder by weight percentage.

An asphalt concrete pavement in the first aspect of the present invention, wherein the percentage of the coarse material accounting for the material of the asphalt concrete pavement is known by those skilled in the art.

In one embodiment, said coarse material accounts for 60%-90% (by weight, similarly hereinafter) of the material of the asphalt concrete pavement, preferably 75-85%.

An asphalt concrete pavement in the first aspect of the present invention, wherein the percentages of the small stone, the macadam and the tone chip of said coarse material respectively and independently accounting for said coarse material are known by those skilled in the art.

In one embodiment, the small stone, the macadam and the tone chip of said coarse material respectively and independently account for 20-45% of said coarse material by weight percentage, preferably 20-40%, and preferably 20-60%.

An asphalt concrete pavement in the first aspect of the present invention, wherein the percentage of the sand contained in the fine material accounting for the material of the asphalt concrete pavement is known by those skilled in the art. In one embodiment, said fine material accounts for 8-25% of the material of the asphalt concrete pavement by weight percentage, preferably 10-15%.

An asphalt concrete pavement in the first aspect of the present invention, wherein the percentage of the mineral powder accounting for the material of the asphalt concrete pavement is known by those skilled in the art. In one embodiment, said mineral powder accounts for 1-8% of the material of the asphalt concrete pavement by weight percentage, preferably 2-8%, and preferably 3-5%.

An asphalt concrete pavement in the first aspect of the present invention, wherein said mineral powder contains a wave absorbing material which accounts for 15%-100% (such as 20-100%, 25-100%, 30-100%, 35-100% or 40-100%) of the mineral powder by weight percentage. In one embodiment, said wave absorbing material also contains balance of powder materials including limestone, dolomite, cement powder, etc. in addition to containing said wave absorbing material.

An asphalt concrete pavement in the first aspect of the present invention, wherein said wave absorbing material is selected from one or multiple materials as follows: ferrite, fly ash, hollow glass, nanometer hollow glass and hollow porous carbon fiber. In one embodiment, said wave absorbing material is ferrite.

The second aspect of the present invention provides an asphalt concrete material for making the asphalt concrete pavement, which includes:
1) a coarse material consisted of small stone with a grain size of 10-15 mm, macadam with a grain size of 5-10 mm and stone chip with a grain size of 0.1-5 mm;
2) a fine material consisted of sand; and
3) a mineral powder;
wherein said mineral powder contains a wave absorbing material which accounts for 10%-100% of the mineral powder by weight percentage.

An asphalt concrete material in the second aspect of the present invention, wherein the asphalt concrete pavement has the characteristics as those of the asphalt concrete pavement in the first aspect of the present invention.

The third aspect of the present invention provides a maintenance (such as preventive maintenance for regeneration) process for said asphalt concrete pavement in the first aspect of the present invention, wherein the process comprises the steps: cleaning the pavement by water, using microwaves to heat the pavement so that the pavement is clean and dry, and spraying asphalt rejuvenator agent on the dry pavement so that the asphalt rejuvenator agent fully penetrates into the pavement; using microwaves to heat the pavement to achieve its remolding degree; and compacting and remodeling the pavement which is heated to the remodeling degree so that the pavement is compact and level.

A process in the third aspect of the present invention, wherein the process comprises the step of using the vibrating compaction or static compaction mode to make the pavement level and compact.

A process in the third aspect of the present invention, wherein the process comprises the following steps:
  a. Cleaning the asphalt pavement by water for removing filth and dust;
  b. Using the microwave to heat the pavement to 100° C.-105° C., holding the temperature for 3-5 minutes so that water and air in the asphalt concrete cracks escape, and fully drying the pavement;
  c. Spraying the asphalt rejuvenator agent onto the surface layer of the asphalt concrete pavement under the condition of heating, so that the surface of the asphalt concrete pavement is moist and has no obvious liquid accumulation, and keeping a period of time so that the asphalt rejuvenator agent penetrates into the asphalt surface layer of 1.5 cm-3 cm of the asphalt concrete;
  d. Using microwaves to heat the pavement to 125° C.-135° C., and holding the temperature for 5-8 minutes to achieve the molding degree of the asphalt concrete;
  e. Using the vibrating compaction or static compaction mode to make the pavement level and compact.

A process in the third aspect of the present invention, wherein the process for leveling and compacting the pavement by the vibrating compaction or static compaction mode comprises the following step: using the vibroroller with the vibration frequency of 40 Hz-45 Hz to roll the pavement under the condition of pavement temperature of 125° C.-135° C.; and using the double-drum static roller or the pneumatic tire roller to accomplish the final rolling when the pavement temperature is reduced to 90° C.-125° C.

The fourth aspect of the present invention provides a mineral powder, containing a wave absorbing material which accounts for 10%-100% of the mineral powder by weight percentage.

A mineral powder in the fourth aspect of the present invention, wherein said mineral powder contains a wave absorbing material which accounts for 10%-100% (such as 20%-100%, 25-100%, 30-100%, 35-100% or 40-100%) of the mineral powder by weight percentage. In one embodiment, said wave absorbing material also contains balance of powder materials including limestone, dolomite, cement powder, etc. in addition to containing said wave absorbing material.

A mineral powder in the fourth aspect of the present invention, wherein said wave absorbing material is selected from the one or multiple materials as follows: ferrite, fly ash, hollow glass, nanometer hollow glass and hollow porous carbon fiber. In one embodiment, said wave absorbing material is ferrite.

The fifth aspect of the present invention provides a use of said mineral powder in the fourth aspect of the present invention in making the asphalt concrete pavement.

The use in the fifth aspect of the present invention, wherein said asphalt concrete pavement has the characteristics as those of said asphalt concrete pavement in the first aspect of the present invention.

The sixth aspect of the present invention provides a use of the wave absorbing material in making the asphalt concrete pavement.

A use in the sixth aspect of the present invention, wherein said wave absorbing material is in the form of mineral powder.

A use in the sixth aspect of the present invention, wherein said wave absorbing material is in the form of mineral powder, and accounts for 10%-100% of the mineral powder by weight percentage. In one embodiment, the wave absorbing material accounts for 15%-100% (such as 20%-100%, 25-100%, 30%-100%, 35-100% or 40-400%) of the mineral powder by weight percentage. In one embodiment, said mineral powder also contains balance of powder materials including limestone, dolomite, cement powder, etc. in addition to containing said wave absorbing material.

A use in the sixth aspect of the present invention, wherein said wave absorbing material is selected from the one or multiple materials as follows: ferrite, fly ash, hollow glass, nanometer hollow glass and hollow porous carbon fiber. In one embodiment, said wave absorbing material is ferrite.

A use in the sixth aspect of the present invention, wherein said asphalt concrete pavement has the characteristics as those of the asphalt concrete pavement in the first aspect of the present invention.

The various aspects and characteristics of the present invention will further be described.

The contents of all the references quoted by the present invention are incorporated into the article by quotation, and if in the event of any inconsistency or conflict between the meaning expressed in references and the meaning expressed in the present invention, the meaning expressed in the present invention shall prevail. In addition, various terms and phrases used in the present invention have the general meaning known by those skilled in the art, but even so the inventor still hopes to exhaustively illustrate and explain the terms and phrases. If in the event of any inconsistency or conflict between the meaning of the terms and phrases and the known meaning, the meaning expressed in the present invention shall prevail.

The term "asphalt concrete pavement" of the present invention is also called "asphalt pavement"; the two terms can be interchangeably used and have the meaning known by those skilled in the art; for example, the asphalt pavement comprises: asphalt concrete pavements, asphalt macadam pavements, asphalt penetration pavements and the like, and most of the existing high-level pavements are asphalt concrete pavements. Both asphalt concrete pavement and asphalt pavement mentioned in the specification refer to all the aforementioned asphalt pavements, preferably, asphalt concrete pavements.

The terms "coarse material", "small stone", "macadam", "stone chip", "fine material", "sand", "mineral powder", etc. of the present invention have the meaning known by those skilled in the art; for example, the terms are described in detail in the Pavement Engineering which is edited by Fang Fusen and is published by the People's Communications Publishing House in Jun. 1, 2004.

The term "wave absorbing material" of the present invention refers to the material with microwave absorbing performance.

The terms "ferrite", "fly ash", "hollow glass", etc. of the present invention have the meaning known by those skilled in the art, and all of them have the function of the wave absorbing material of the present invention.

The term "asphalt concrete material" of the present invention refers to a mixed material which can be used for making asphalt concrete pavement. For the asphalt concrete material of the present invention, it has the characteristics described in the present invention, and/or has other characteristics known by those skilled in the art.

As mentioned in the present invention, the term "asphalt rejuvenator agent" has the meaning known by those skilled in the art; for example, the term is described in detail in the Evaluation on Performance of Asphalt Rejuvenator Agent-Journal of Highway and Transportation Research and Development, No. 3 journal, 2007, Transportation College, Southeast University, Jiangsu Nanjing, 210096, China (CAO Rongji, CHEN Rong-sheng); Jiangsu Transportation Research Institute Co. Ltd., Jiangsu Nanjing, 210017, China (XU Zheng-lin); or the asphalt rejuvenator agent may be purchased in the market by the following trade name: C(CRF) asphalt rejuvenator agent.

In the present invention, the applicant tries to provide an effective maintenance process by microwave heating the asphalt concrete pavement; but it is found that the existing asphalt concrete has great unsuitability in the use aspect, because microwave heating is performed by heat radiation rather than being performed by heat conduction; the microwave energy absorbed by the dielectric material is transformed into heat energy, dipoles are formed in the dielectric material or the existing dipoles are rearranged at the speed changed for tens of thousands of times per second in the microwave electromagnetic field, and the dipoles are swayed at high speed of hundreds of millions of times per second with the high-frequency alternation electromagnetic field. If molecules are rearranged in the direction of the ever-changing high-frequency electric field, the interference and impediment between the original thermal motion of the molecules and the interaction between molecules should be overcome, and the action which is similar to friction should be produced, to achieve molecular level mixing. Thus, a large number of heat is produced, namely the temperature of microwave heating is improved by absorbing heat of the material. This is different from the conventional heating. The conventional heating uses the heat transmitting mode including conduction, convection and radiation to heat the environmental or solid surface around the solid, so that the solid surface obtains heat, and the heat is transmitted to the inside of the solid in the heat conducting mode. Microwave heating energy absorption is related to many factors; the external factors include frequency, temperature, the internal field intensity, density and the like; in the internal factor, the absorbing efficiency of the material to the microwave energy directly influences the temperature rise of the material and the transmission of the microwave in the material, and the absorbing efficiency is usually expressed by the dielectric characteristic of the material. The characteristic is mainly related to the dielectric constant e' of the material, the dielectric loss factor e" and the loss tangent tan δ of the material. The dielectric constant e' influences the energy preservation of the material under the action of the electric field; the electric loss factor e" expresses the heat loss of the microwave energy transmitted in the material; loss tangent tan δ=e"/e'. The dielectric characteristics of some common materials are shown in Table 1.

TABLE 1

| Material | | t/° C. | f/MHz | e' | tan δ |
|---|---|---|---|---|---|
| Water | | 25 | 300 | 77.5 | 0.016 |
| | | 25 | 3000 | 76.7 | 0.157 |
| Asphalt Cement | | 26 | 3000 | 25 | 0.001 |
| Aggregate material diorite | | 20 | 2450 | 5.6-7.0 | 0.018-0.036 |
| Asphalt | Diorite-containing | 20 | 2450 | 5.8 | 0.034 |
| concrete | Limestone-containing | 20 | 2450 | 6.7 | 0.015 |
| | Quartz-containing | 20 | 2450 | 4.0 | 0.006 |

The asphalt has low efficiency for absorbing microwave energy, and mainly depends on the aggregate material to produce heat and transmit the heat to the asphalt. In the existing asphalt concrete at present, the aggregate material has low efficiency for absorbing microwaves, as shown in Table 1.

Obviously, because the asphalt and general aggregate materials forming the asphalt concrete have low efficiency for absorbing microwave and are uniformly distributed, the uniformity of the heat distribution of microwave heating in asphalt concrete is poor; it is difficult to control the microwave energy in the direction of the pavement depth, and it is difficult to meet the requirement hoped in engineering, which is that the temperature of the lower layer is higher, and the temperature of the upper layer is somewhat lower.

Conventionally, the asphalt concrete pavement includes a coarse material consisted of small stone with a grain size of 10-15 mm, macadam with a grain size of 5-10 mm and stone chip with a grain size of 0.1-5 mm, a fine material consisted of sand, and a mineral powder, wherein all the materials are mixed and formed in accordance with the conventional proportion. In the mixture, the conventional coarse material and fine material mainly contain diorite, limestone, quartz, etc., and the materials have low microwave absorptivity. However, because a great deal of coarse material and fine material are used and are not uniformly distributed in the asphalt concrete, and high strength is required, it is very difficult to replace the coarse and fine materials with the wave absorbing material.

In order to avoid the aforementioned defects existing in the prior art, the present invention provides a mineral powder of the asphalt concrete which can be heated by microwaves and a use thereof. The asphalt concrete mixed with the mineral powder has higher absorbing efficiency than that of the conventional asphalt concrete in the aspect of microwave heating, by effectively selecting the components and content of the mineral powder in the asphalt concrete; the microwave heat energy is uniformly distributed in the asphalt concrete; and the distribution of the microwave energy in the direction of the pavement depth is effectively controlled.

An asphalt concrete pavement or an asphalt concrete material for making the asphalt concrete pavement of the present invention, wherein all the materials can be mixed and formed in accordance with the conventional proportion by referring to the existing knowledge of the technical field. In the component of the asphalt concrete pavement or the asphalt concrete material for making the asphalt concrete pavement of the present invention, the conventional coarse material and fine material mainly contain diorite, limestone, quartz, etc., and the materials have low microwave absorptivity. However, because a great deal of coarse material and fine material are used and are not uniformly distributed in the asphalt concrete, and high strength is required, it is very difficult to replace the coarse and fine materials are with the wave absorbing material.

A mineral powder of the asphalt concrete which can be heated by microwaves of the present invention, wherein said mineral powder contains the ferrite which accounts for 10%-100% of the mineral powder by weight percentage.

A use of the mineral powder of the asphalt concrete material which can be heated by microwaves of the present invention, wherein the contents of the ferrite contained in the mineral powder of the asphalt concrete of the upper layer, the middle layer and the lower layer of the same highway section are respectively set as required. Thus, the distribution of the microwave energy in the depth direction of the pavement is regulated, so that the heating temperature required by each layer is obtained, and the controllability of the microwave heating asphalt concrete is achieved.

The wave absorbing material is divided into resistor wave absorbing material, dielectric wave absorbing material, and magnetic medium wave absorbing material in accordance with the mechanism of material consumption.

Carborundum, plumbago and the like belong to the resistor wave absorbing material, and whose resistor function mainly attenuate the electromagnetic energy;

Barium titanate and the like belong to the dielectric wave absorbing material, which relax, attenuate and absorb the electromagnetic waves by dielectric electron polarization, ionic polarization, molecular polarization or interfacial polarization of the dielectric.

Ferrite belongs to the magnetic medium wave absorbing material, which has higher magnetic loss angle tangent, and attenuates and absorbs the electromagnetic waves by the magnetic polarization mechanisms of magnetic hysteresis loss, domain wall resonance, natural resonance, after effect loss, etc.

The research of the present invention proves that ferrite is a cheap material with preferable wave absorbing property, and has ferromagnetism and dielectric property. Because the resistivity of ferrite is high, the electromagnetic waves can effectively enter the inside of ferrite, and both electric loss and magnetic loss can be generated under certain conditions. Ferrite has good damping effect on the electromagnetic waves, has the characteristics of high absorbing frequency band, high absorptivity, thin matching thickness, etc. In accordance with the law that the electromagnetic waves are transmitted from the low magnetic permeability direction to the high magnetic permeability direction in the medium, the electromagnetic wave energy is changed into heat energy by guiding the electromagnetic waves through the high permeability ferrite and greatly absorbing the electromagnetic wave radiation energy through resonance and through coupling.

The dielectric constant e' of the ferrite is about 10, the dielectric loss factor e'' is about 0.6, and the loss tangent tan δ of the material is about 0.06. The ferrite with high permeability has good electromagnetic wave absorbing property, and the wave absorbing ability is several hundreds of times of that of the general materials. The ferrite only has the defects of high density and poor temperature stability. But the two defects have no influence on the technical schemes of the present invention.

Compared with the prior art, the present invention, which uses the wave absorbing material (such as ferrite) to replace partial or all mineral powder of the asphalt concrete, has the following advantages: 1. the microwave absorbing efficiency of the asphalt concrete is greatly increased because the microwave absorbing efficiency of the ferrite is much higher than that of the ordinary mineral powder; 2. the uniformity of the spread of microwave heat energy is greatly increased because the granule size is small after the ferrite is processed into powder granules, and the powder granules can be uniformly distributed into the asphalt concrete and can be used as adding material to form many tiny microwave absorbing points in the asphalt concrete to heat the asphalt concrete; 3. in one embodiment, for the construction of the asphalt concrete pavement, different amounts of ferrite are set to be added into the upper layer, the middle layer and the lower layer. Thus, the microwave absorbing efficiency of each layer of asphalt concrete is set; the distribution of the microwave energy in the depth direction of the pavement is regulated; and the controllability of the microwave heating of asphalt concrete is effectively increased.

On the basis of the overall idea of the present invention, the present invention provides a mineral powder of asphalt concrete, which can be heated by microwaves, and a use thereof, wherein said mineral powder contains a ferrite which accounts for 10%-100% of the mineral powder by weight percentage; the use of the mineral powder includes respectively setting the required contents of the ferrite contained in the mineral powder of the asphalt concrete of the upper layer, the middle layer and the lower layer of the same highway section. Thus, the distribution of the microwave energy in the depth direction of the pavement is regulated, so that the heating temperature required by each layer is obtained, and the controllability of the microwave heating asphalt concrete is achieved. The asphalt concrete mixed with the mineral powder of the present invention has the higher absorbing efficiency than that of the conventional asphalt concrete in the aspect of microwave heating. Thus, the microwave heat energy is uniformly distributed in the asphalt concrete, and the distribution of the microwave energy in the direction of the pavement depth is effectively controlled.

On the basis of the overall idea of the present invention, the present invention provides an economical, practical and convenient preventive maintenance process for asphalt pavement without destroying the pavement in order to avoid the defects of the prior art.

The preventive maintenance process for asphalt pavement of the present invention, wherein the process comprises the following steps: cleaning the pavement by water; using microwaves to heat the pavement so that the pavement is clean and dry; spraying asphalt rejuvenator agent on the dry pavement so that the asphalt rejuvenator agent fully penetrates into the pavement; using microwaves to heat the pavement to achieve its remolding degree; and compacting and remolding the pavement which is heated to the remolding degree so that the pavement is compact and level.

The preventive maintenance process for asphalt pavement of the present invention, wherein the process comprises the following steps:
a. cleaning the asphalt pavement by water for removing filth and dust;
b. using microwaves to heat the pavement to 100° C.-105° C., holding the temperature for 3-5 minutes so that water and air in the asphalt concrete cracks escape, and fully drying the pavement;
c. spraying the asphalt rejuvenator agent on the surface layer of the asphalt concrete pavement under the condition of heating so that the surface of the asphalt concrete pavement is moist and has no obvious liquid accumulation, keeping a period of time so that the asphalt rejuvenator agent penetrates into the asphalt surface layer of 1.5 cm-3 cm of the asphalt concrete;
d. using microwaves to heat the pavement to 125° C.-135° C., holding the temperature for 5-8 minutes to achieve the molding degree of the asphalt concrete;
e. using the vibrating compaction or static compaction mode to make the pavement level and compact.

In the aforementioned step e, using the vibroroller with the vibration frequency of 40 Hz-45 Hz to roll the pavement under the condition of pavement temperature of 125° C.-135° C.; and using the double-drum static roller or the pneumatic tire roller to accomplish the final rolling when the pavement temperature is reduced to 90° C.-125° C.

During the maintenance of the asphalt pavement, under the action of microwaves, the microwave energy absorbing efficiency of various materials in the asphalt concrete directly influences the temperature rise of the materials and the transmission of the microwaves in the materials; and the absorbing efficiencies of water, sand aggregate material and asphalt are arranged in order from high to low. Thus, water is directly evaporated at the earliest. Because asphalt (accounts for 5.2% by weight percentage) slowly absorbs the microwave heat, the heat is mainly generated and transmitted by the sand to the asphalt. Thus, the interface viscosity between the asphalt and the aggregate material is obviously improved. In addition, the microwave heating speed is quick and is easy to control so that good instantaneity and controllability can be reflected. In the practical test, the test result shows that after the pavement is heated by microwaves for 15 minutes, the heating depth is about 8 cm, the temperature of the upper layer of 0-2 cm is 145-165° C., the temperature of the middle layer of 2-5 cm is 90-115° C., and the temperature of 3 cm below the middle layer is 65-75° C. The temperature is very suitable for the compaction and the remodeling of the asphalt mixture.

For the slightly deformed pavement, only the pavement of 0-3 cm below the surface layer is required to be remodeled, and the general preventive maintenance will not cause deeper deformation; in addition, the asphalt concrete is a visco-elasto-plastic material; its characteristic is not obviously changed when the temperature is changed from 70° C. to 165° C.; only the plasticity is slowly increased with the temperature rise, and the elasticity is slowly reduced with the temperature rise.

Compared with the prior art, the aforementioned process of the present invention has the advantages of: 1) heating and remodeling the original pavement, and changing the wasting phenomena of adding asphalt rejuvenator agent for thermal agitation regeneration before milling and repaving or downgrading use, and economy and environmental protection; 2) heating the pavement by microwaves to evaporate a great deal of harmful impurity water which influences the performance of the asphalt concrete pavement, spraying the asphalt rejuvenator agent on the pavement, and repairing the asphalt concrete surface cracks so that the asphalt concrete pavement has better service performance and longer service life, and that the asphalt pavement maintenance has the preferable technical effects of economy, practicability and convenience; 3) quick construction so that the traffic can be quickly recovered; 4) good repair effect so that the pavement is the same as the new pavement on driving comfort and appearance; 5) stable construction quality so that the original pavement is further compacted so that the compaction effect of the pavement is better.

In accordance with the overall idea of the present invention, the preventive maintenance process for asphalt pavement of the present invention comprises the following steps: cleaning the pavement by water; using microwaves to heat the pavement so that the pavement is clean and dry; spraying the asphalt rejuvenator agent on the dry pavement so that the asphalt rejuvenator agent fully permeates into the pavement; using microwaves to heat the pavement to achieve its remolding degree; and performing compaction remodeling to the pavement which is heated to the remodeling degree so that the pavement is compact and level. The process of the present invention has the advantages of economy, practicability and convenience under the condition of not destroying the pavement.

DETAILED DESCRIPTION

The present invention will further be described in detail in accordance with the embodiments. However, this invention is not limited to the specific embodiments. For the professionals of the technical field, on the premise of keeping the conception and the scope of the present invention, the professionals can also make various changes and modifications.

The present invention generally and/or specifically describes the materials used in the test and the test methods. The present invention still describes the materials and the operating methods in detail as far as possible, although many materials and operating methods used for achieving the aims of the present invention are known in the technical field, for example, the materials can be purchased in the business way or can be synthesized and obtained by the ordinary technical personnel of the technical field in accordance with the present invention or the instruction of the prior art.

Embodiment 1: asphalt concrete pavement, asphalt concrete materials, materials for making concrete pavement and performance test.

In the embodiment, both the asphalt concrete and the asphalt added into the asphalt concrete are combined in accordance with the conventional form, and the bitumen aggregate ratios (i.e. the proportion of asphalt to stone) are combined in accordance with the conventional asphalt concrete. The assemblage materials are prepared in accordance with the conventional sieving and combination. For example, according to the weight percentage of the assemblage material, 27 portions of small stone with a grain size of 10-15 mm, 22 portions of macadam with a grain size of 5-10 mm, 35 portions of tone chip with a grain size of 0-5 mm, 12 portions of medium sand and 4 portions of mineral powder are respectively weighed.

The embodiment is different from the prior art in that all or partial mineral powder in the embodiment is replaced by ferrite, the ferrite accounts for 10%-100% of the total mineral powder by weight percentage, and accounts for 65% in the embodiment.

In practical application, the contents of ferrite are sequentially added in the upper layer, the middle layer and the lower layer of the same highway section. Thus, the distribution of the microwave energy in the depth direction of the pavement is regulated, and the controllability of the microwave heating asphalt concrete is effectively increased.

The asphalt concrete pavement is divided into an upper layer, a middle layer and a lower layer. In the general structure, the upper layer is consisted of fine-graded asphalt concrete with the thickness h1 of 3 cm; the middle layer is consisted of medium-graded asphalt concrete with the thickness h2 of 4 cm, and the lower layer is consisted of coarse-graded asphalt concrete with the thickness h3 of 7 cm. In the practical test, the test result shows that after the pavement of asphalt concrete mixed and prepared by conventional materials is heated by microwaves for 15 minutes, the heating temperature of its upper layer is 140-170° C.; the temperature of the middle layer is 90-110° C.; and the temperature of the lower layer is only 60-70° C. Because the process of compaction without destroying the original pavement is used, the compacting effect of compacting machine to the pavement is reduced with the reduction of the pavement depth, and is reduced with the reduction of asphalt temperature. In order to the achieve the deep compacting and remodeling effect, 100% mineral powder in the lower layer can be replaced by ferrite; 40% mineral powder in the middle layer can be replaced by ferrite; and 10% mineral powder in the upper layer can be replaced by ferrite. Because it is difficult to accurately measure the wave absorbing property of the ferrite as a wave absorbing material, and the test instrument is complicated, the following design criteria about the ferrite absorber can be obtained in accordance with theoretical and computational analysis:

1. the design key of the ferrite absorber is to improve the wave-absorbing property of the low-frequency (i.e. about 30 MHz) part;
2. in the low-frequency part, the wave-absorbing property of the ferrite absorber is directly related to the inherent magnetic loss angle tangent. Thus, the low-frequency wave-absorbing property of the ferrite absorber can be directly increased by increasing the ferrite magnetic loss angle tangent;

3. in the low-frequency part, the thickness of the ferrite absorber has obvious influence on the wave-absorbing property; the thicker the absorber is, and the better the wave-absorbing property is; thus, the influence of the thickness and the weight of the absorber should be comprehensively considered during design; and 4. the influence of the dielectric constant on the wave-absorbing property is mainly in the high-frequency part of more than 100 MHz.

Because only the stone of the asphalt concrete absorbs microwave energy basically, the asphalt can be ignored in analysis. In general, the wave-absorbing property of the ferrite is calculated as 180 times of that of the natural stone, and the microwave heat absorbing property is designed in accordance with the proportion: in the asphalt concrete, according to the weight percentage of the assemblage material, 27 portions of small stone with a grain size of 10-15 mm, 22 portions of macadam with a grain size of 5-10 mm, 35 portions of tone chip with a grain size of 0-5 mm, 12 portions of medium sand and 4 portions of mineral powder are respectively weighed for calculation. If the wave-absorbing ability of asphalt is ignored, 100 portions of the assemblage material only contain 4 portions of mineral powder. Suppose the wave-absorbing ability of the natural stone is 1, the wave-absorbing ability of the ferrite is 180, and the comparison of the wave-absorbing ability of all the layers is as follows.

The original layers (without the traditional condition of replacing mineral powder with ferrite): 96+4=100

Upper layer: 96+4*0.9+4*0.1*180=171.6
Middle layer: 96+4*0.6+4*0.4*180=387.2
Lower layer: 96+4*180=816

Thus, the depth influence is offset by the microwave absorbing ability of each layer, so that energy is uniformly applied into the pavement asphalt concrete; the influence on other base materials which do not need heating is reduced; and the targeted heating is increased. The heated temperatures of the upper layer, the middle layer and the lower layer are nearly the same; the bottom layer under the layers is hardly heated; little of heat is dissipated; the microwave heating is performed for 15 minutes, and the temperatures of all the layers are 100-130° C.

By using the microwave targeted heating principle, the microwave absorbing quantity of each layer is adjusted by adjusting the ferrite content of the asphalt concrete of each layer through test to achieve the aims of adjusting the heating temperature required by each layer, meeting the compacting requirement of the compacting machine, and meeting the design requirement.

Embodiment 2: maintenance process for asphalt concrete pavement.

The embodiment comprises the following steps:

1. cleaning the asphalt pavement with high pressure water by using a hydraulic monitor for removing filth and dust;
2. using a microwave pavement heating device to heat the pavement to 100° C.-105° C. through microwaves, holding the temperature for 3-5 minutes so that water and air in the asphalt concrete cracks escape, fully removing water, drying the pavement, and providing conditions for the asphalt rejuvenator agent to preferably exert the function; the temperature of 100° C.-105° C. can avoid the side effect of asphalt ageing caused by over-high temperature and can fully evaporate the water in the asphalt concrete;
3. spraying the asphalt rejuvenator agent on the surface layer of the asphalt concrete pavement with a spraying machine under the condition of heating, so that the surface of the asphalt concrete pavement is moist and has no obvious liquid accumulation; keeping a period of time so that the asphalt rejuvenator agent penetrates into the surface layer of 1.5 cm-3 cm of the asphalt concrete pavement; the asphalt rejuvenator agent should be used at the temperature of higher than 15° C.; the higher the temperature is, and the better the construction effect is;
4. using microwaves to heat the pavement to 125° C.-135° C., holding the temperature for 5-8 minutes to achieve the molding degree of the asphalt concrete;
5. rolling the pavement in accordance with the machinery combination for general asphalt concrete pavement construction during natural temperature fall, such as vibrating compaction or static compaction mode, so that the pavement is level and compact to achieve the aims of closing the pavement holes, stabilizing the loose aggregate material, and repairing the aged pavement.

In the specific embodiment, when the pavement temperature is between 125° C. to 135° C., a double-drum static roller of a large tonnage of 12-16T, or a tire roller, or a vibroroller of 11-16T is used to roll the pavement. Preferably vibroroller is used, and the vibration frequency of the vibroroller is preferably set at 40 Hz-45 Hz, to prevent the aggregate material from being rammed by the low-frequency high amplitude; when the pavement temperature is reduced to 90° C.-125° C., the double-drum static roller of 6-8T or the pneumatic tire roller is used to accomplish the final rolling.

Because the asphalt for highway generally begins to lose agglutination below 90° C., the final rolling temperature should be controlled above 90° C. preferably. If temperature is too low, stop rolling immediately to avoid hidden danger caused by the loose skeletal material under the function of the highway roller compaction load.

The asphalt rejuvenator agent is a brown liquid and has good fluidity. After being sprayed, the asphalt rejuvenator agent rapidly penetrates into the asphalt pavement of about 3 cm-4 cm, chemically reacts with the aged asphalt, activates the aged asphalt, renews and deoxidizes the oxidized asphalt cement so that the penetration, the softening point, the viscosity and the ductility of the asphalt are recovered and a new protective layer is formed to prevent water from entering. The original ashen and dry pavement is changed into a black and glossy pavement after being treated, the service life of the asphalt highway is extended for 3-5 years, and the original performance of the highway is not changed. Thus, the service life of the pavement is extended.

The invention claimed is:

1. An asphalt concrete pavement contains:
1) a coarse material consisted of small stone with a grain size of 10-15 mm, macadam with a grain size of 5-10 mm and stone chip with a grain size of 0.1-5 mm;
2) a fine material consisted of sand; and
3) a mineral powder;
wherein said mineral powder contains a wave absorbing material which accounts for 10%-100% of the mineral powder by weight percentage; wherein distribution of the microwave absorbing material in the depth direction of the asphalt concrete pavement is regulated so that there is more microwave absorbing material at a greater depth of the asphalt concrete pavement.

2. The asphalt concrete pavement of claim 1, wherein the asphalt concrete pavement comprises an upper layer, a middle layer and a lower layer; wherein amounts of wave absorbing material within the upper layer, the middle layer and the lower layer are set to be different.

3. The asphalt concrete pavement of claim 1, wherein said wave absorbing material is selected from a group consisting of: ferrite, fly ash, hollow glass, nanometer hollow glass, hollow porous carbon fiber and a combination thereof.

4. The asphalt concrete pavement of claim 2, wherein said wave absorbing material is selected from a group consisting of: ferrite, fly ash, hollow glass, nanometer hollow glass, hollow porous carbon fiber and a combination thereof.

5. A maintenance process for asphalt concrete pavement of claim 1, wherein said process comprises the following steps: a. cleaning the pavement by water; b. using microwaves to heat the pavement so that the pavement is clean and dry; c. spraying asphalt rejuvenator agent on the dry pavement so that the asphalt rejuvenator agent fully permeates into the pavement; d. using microwaves to heat the pavement to achieve its remolding degree; and e. compacting and remodeling the pavement which is heated to the remodeling degree so that the pavement is compact and level.

6. The method of claim 5, wherein said method comprises the following steps:

wherein said step b. further comprises heating the pavement with said microwaves to 100° C.-105° C., holding the temperature for 3-5 minutes so that water and air in the asphalt concrete cracks escape, and fully drying the pavement;

wherein said step c. further comprises providing condition of heating, so that the surface of the asphalt concrete pavement is moist and has no liquid accumulation, and keeping a period of time so that the asphalt rejuvenator agent penetrates into the asphalt surface layer of 1.5 cm-3 cm of the asphalt concrete;

wherein said step d. further comprises heating the pavement with said microwave to 125° C.-135° C., holding the temperature for 5-8 minutes to achieve the molding degree of the asphalt concrete.

7. The method of claim 6, wherein said step e. further comprises using a vibroroller with a vibration frequency of 40 Hz-45 Hz under the condition of pavement temperature of 125° C.-135° C., and using a double-drum static roller or a pneumatic tire roller to accomplish a final rolling when the pavement temperature is reduced to 90° C.-125° C.

* * * * *